US007055840B1

(12) United States Patent
Kelso

(10) Patent No.: US 7,055,840 B1
(45) Date of Patent: Jun. 6, 2006

(54) LIFT WHEELCHAIR

(76) Inventor: Thomas G. Kelso, 15331 Woodmoss Dr., Baton Rouge, LA (US) 70816

( * ) Notice: Subject to any disclaimer, the term of this patent is extended or adjusted under 35 U.S.C. 154(b) by 0 days.

(21) Appl. No.: 10/990,574

(22) Filed: Nov. 17, 2004

(51) Int. Cl.
*B62M 1/14* (2006.01)

(52) U.S. Cl. .............................. 280/250.1; 280/304.1; 280/649; 297/DIG. 4

(58) Field of Classification Search ............ 280/250.1, 280/304.1, 658, 657, 30, 650, 643, 47.38, 280/37; 297/DIG. 4, 6, 344.12, 344.14, 297/34.15, 344.16; 414/921
See application file for complete search history.

(56) References Cited

U.S. PATENT DOCUMENTS

| | | | | | |
|---|---|---|---|---|---|
| 2,976,912 | A | * | 3/1961 | Dias | 280/658 |
| 2,982,336 | A | * | 5/1961 | Minici | 280/37 |
| 3,123,400 | A | * | 3/1964 | Paulson | 297/344.16 |
| 3,379,450 | A | * | 4/1968 | Emerson et al. | 280/657 |
| 3,882,949 | A | * | 5/1975 | Anderson | 280/250.1 |
| 4,415,202 | A | | 11/1983 | Pew | |
| 4,786,064 | A | * | 11/1988 | Baghdasarian | 280/30 |
| 4,993,736 | A | * | 2/1991 | Garman et al. | 280/304.1 |
| 5,161,812 | A | * | 11/1992 | DeWeese | 280/47.38 |
| 5,601,302 | A | | 2/1997 | Beard et al. | |
| 5,651,149 | A | * | 7/1997 | Garman | 414/921 |
| 5,669,086 | A | * | 9/1997 | Garman | 280/250.1 |
| 5,816,655 | A | * | 10/1998 | Hoegh | 297/344.14 |
| 6,467,785 | B1 | | 10/2002 | Toppses | |
| 6,715,783 | B1 | * | 4/2004 | Hanson et al. | 280/47.38 |
| 6,935,648 | B1 | * | 8/2005 | Beck | 280/250.1 |
| 2003/0218310 | A1 | | 11/2003 | Volk et al. | |
| 2004/0075237 | A1 | | 4/2004 | Beck | |

FOREIGN PATENT DOCUMENTS

| | | | |
|---|---|---|---|
| EP | 1 133 968 | A3 | 3/2002 |
| JP | 2001299822 | A | 10/2001 |
| JP | 2002153514 | A | 5/2002 |

* cited by examiner

*Primary Examiner*—Hau Phan
(74) *Attorney, Agent, or Firm*—André J. Porter

(57) ABSTRACT

A wheelchair that enables its occupant to lower and raise their self to and from the surface on which the wheelchair is resting so that the occupant may enter the wheelchair from the surface without the aid of another person, the wheelchair a lower support frame, a seat frame assembly vertically movable relative to the lower support frame, a lifting assembly connected to the lower support frame and to the seat frame assembly, a planar ramp rotatably connected to the seat frame, the planar ramp rotating to form an inclined plane relative to the plane of the seat frame, the planar ramp rotating to a vertical position relative to the horizontal seat beneath the horizontal seat when the seat frame assembly is at its highest vertical position, and a footrest rotatably, the footrest rotating to a horizontal position when the seat frame assembly is at its highest vertical position, the footrest rotating downward beneath the ramp when the seat frame assembly is at its lowest vertical position.

17 Claims, 8 Drawing Sheets

LIFT WHEELCHAIR

BACKGROUND OF THE INVENTION

1. Field of the Invention

The present invention relates to wheelchairs. In particular, the present invention is related to wheelchairs which provide access to the wheelchair from ground level.

2. Description of the Related Art

Wheelchairs are well known in the art and have been in existence for many years. Wheelchair design has undergone extensive modification and refinement, yet the basic design of most wheelchairs has remained relatively consistent. Typical wheelchairs of the past had two large drive wheels connected by an elongated rigid axle supporting a frame or seat on which an individual may be seated. Later versions of the wheelchair eliminated the elongated axle connecting the large drive wheels, but the support frame or other structural members prevented the seat from being moved below a pre-established height.

Some physically disabled persons utilizing a wheelchair, such as paraplegics having normal upper body strength, may engage in physical exercises conducted while sitting or lying supine on the floor or ground. Such a person may also desire to sit on the ground for gardening or for playing with their young children or grandchildren. Such persons commonly require assistance to be lowered to the floor or ground from a conventional wheelchair seat to perform such exercises or tasks.

Exemplary of the related art are the following: U.S. Pat. Nos. 3,123,400; 4,415,202; 5,601,302; and 6,467,785; U.S. Patent Application Publication Numbers U.S. 2003/0218310 A1 and U.S. 2004/0075237 A1; European Patent Publication EP 1 133 968 A3; Japan Publication Number 2001299822 A and Japan Publication Number 2002153514 A.

BRIEF SUMMARY OF THE INVENTION

In accordance with the present invention there is provided a wheelchair that enables its occupant to lower and raise their self to and from the surface on which the wheelchair is resting so that the occupant may enter the wheelchair from the surface without the aid of another person, the wheelchair a lower support frame, a seat frame assembly vertically movable relative to the lower support frame, a lifting assembly connected to the lower support frame and to the seat frame assembly, a planar ramp rotatably connected to the seat frame, the planar ramp rotating to form an inclined plane relative to the plane of the seat frame, the planar ramp rotating to a vertical position relative to the horizontal seat beneath the horizontal seat when the seat frame assembly is at its highest vertical position, and a footrest rotatably, the footrest rotating to a horizontal position when the seat frame assembly is at its highest vertical position, the footrest rotating downward beneath the ramp when the seat frame assembly is at its lowest vertical position.

DETAILED DESCRIPTION OF THE INVENTION

Figure 1:
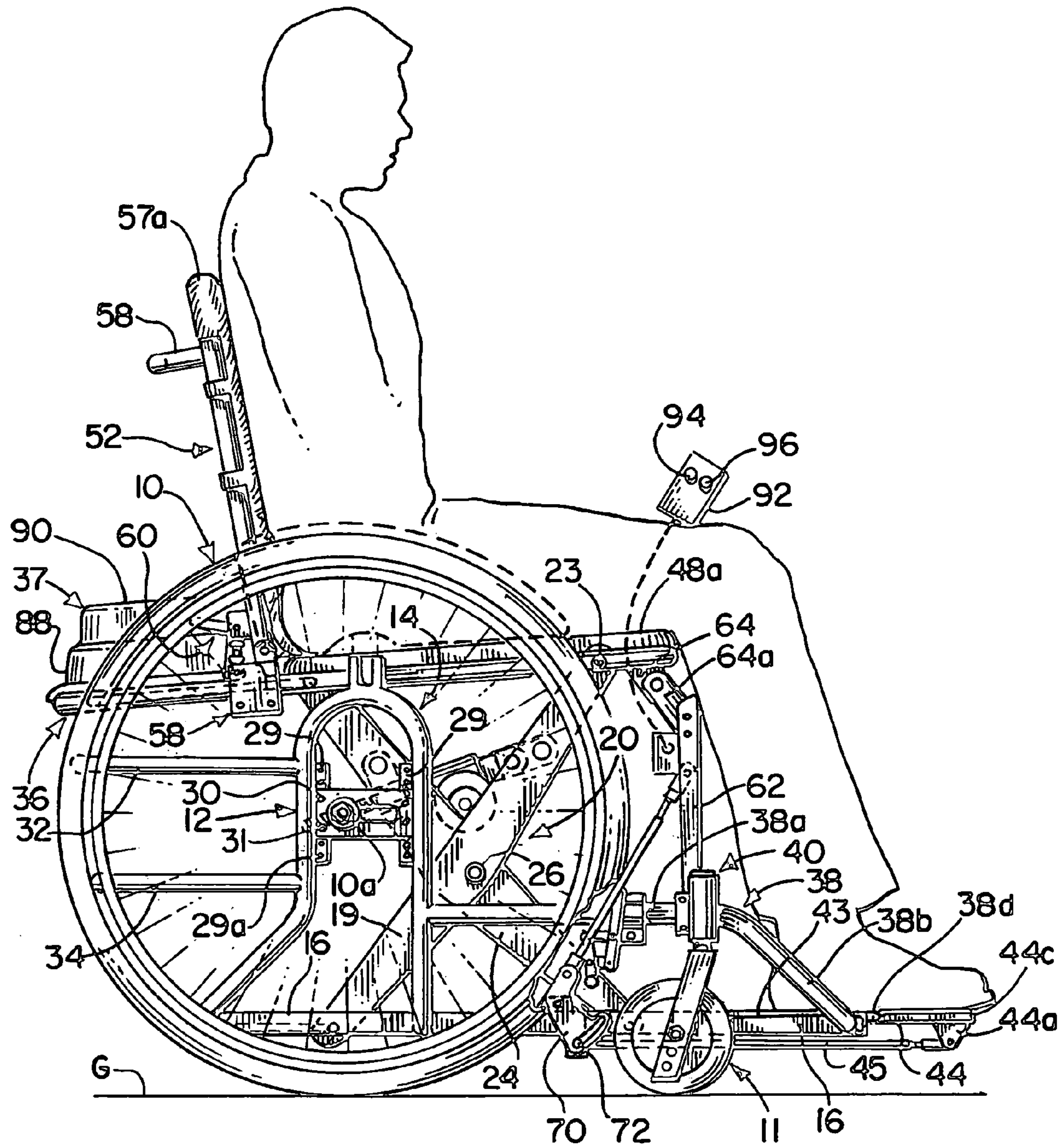
FIG. 1 is a side elevational view of the lift wheelchair of the invention in the normal elevated position having an occupant shown in phantom lines sitting therein.
Figure 2:
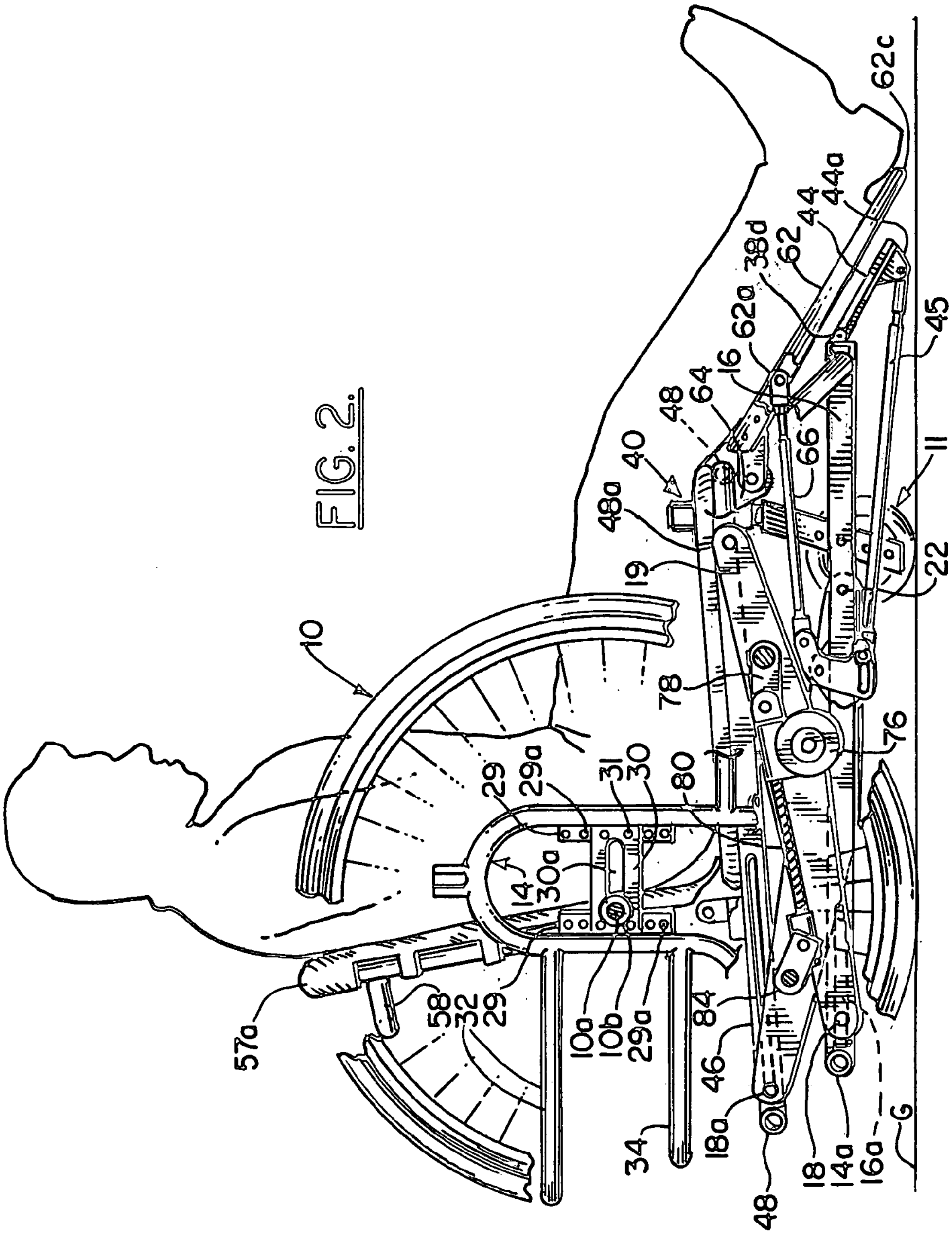
FIG. 2 is a side elevational view of the lift wheelchair of the invention in the lowered position having an occupant shown in phantom lines sitting therein.
Figure 6:
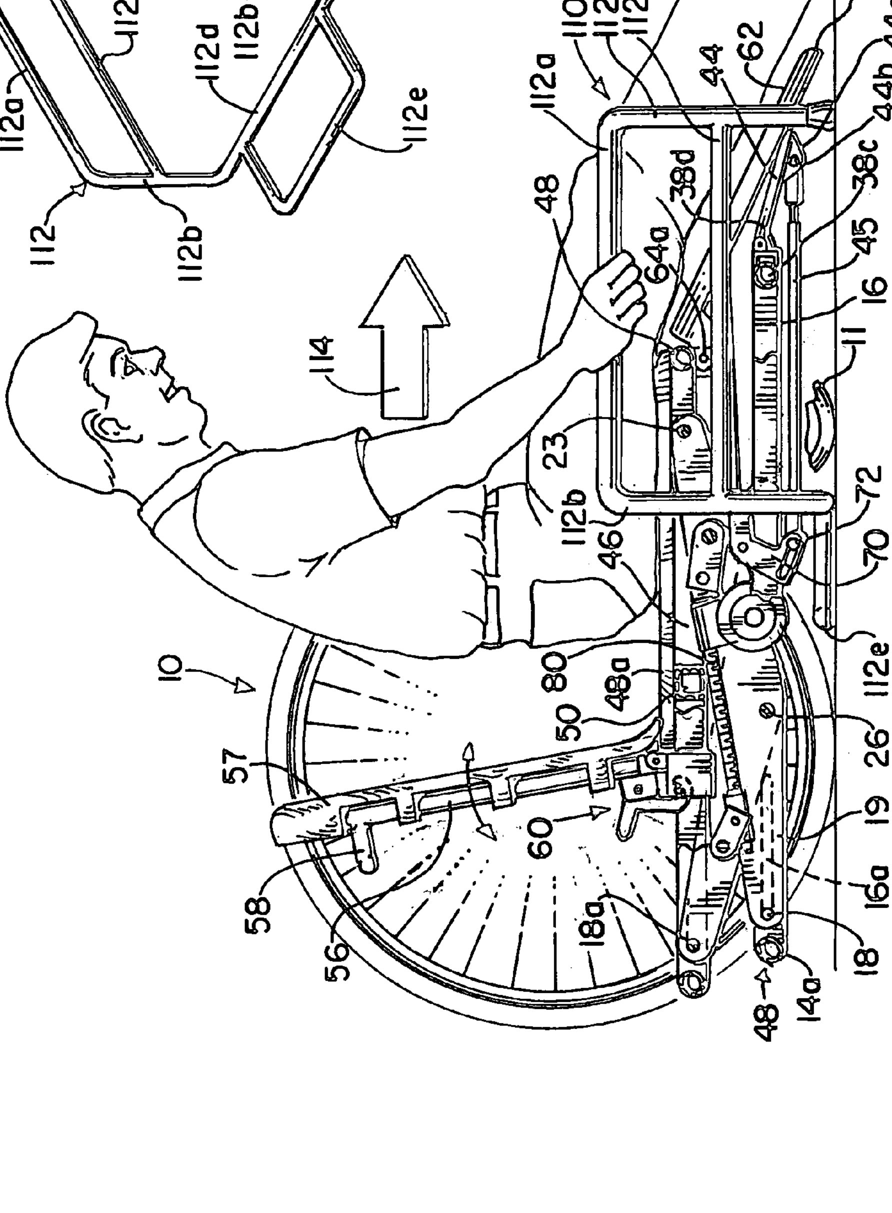
FIG. 6 is a partly cut-away, partly schematic side elevational view of the lift wheelchair of the invention in the lowered position of FIGS. 2 and showing the scissor lift components in greater detail with some of the tubular support frame components removed and an occupant shown in phantom lines utilizing an access frame to mount or exit the lift wheelchair of the invention.

Referring now to the drawings, the lift wheelchair of the invention enables a disabled person such as a paraplegic having normal upper body strength to lower the seat of the lift wheelchair of the invention from the position shown in FIG. 1 to the surface G upon which the wheelchair is resting to the lowered position shown in FIG. 2 to enable the disabled person to exit from the lift wheelchair as shown in FIG. 6 to the surface G without the aid of another person.

The lift wheelchair of the invention is supported by two conventional wheelchair drive wheels generally indicated by the numerals 10—10 and two conventional casters generally indicated by the numerals 11—11 mounted near the front of the lift wheelchair. Drive wheels 10—10 are grasped by the hands of the occupant of the lift wheelchair and rotated to propel the lift wheelchair in the desired direction as known in the wheelchair art.

Figure 7:
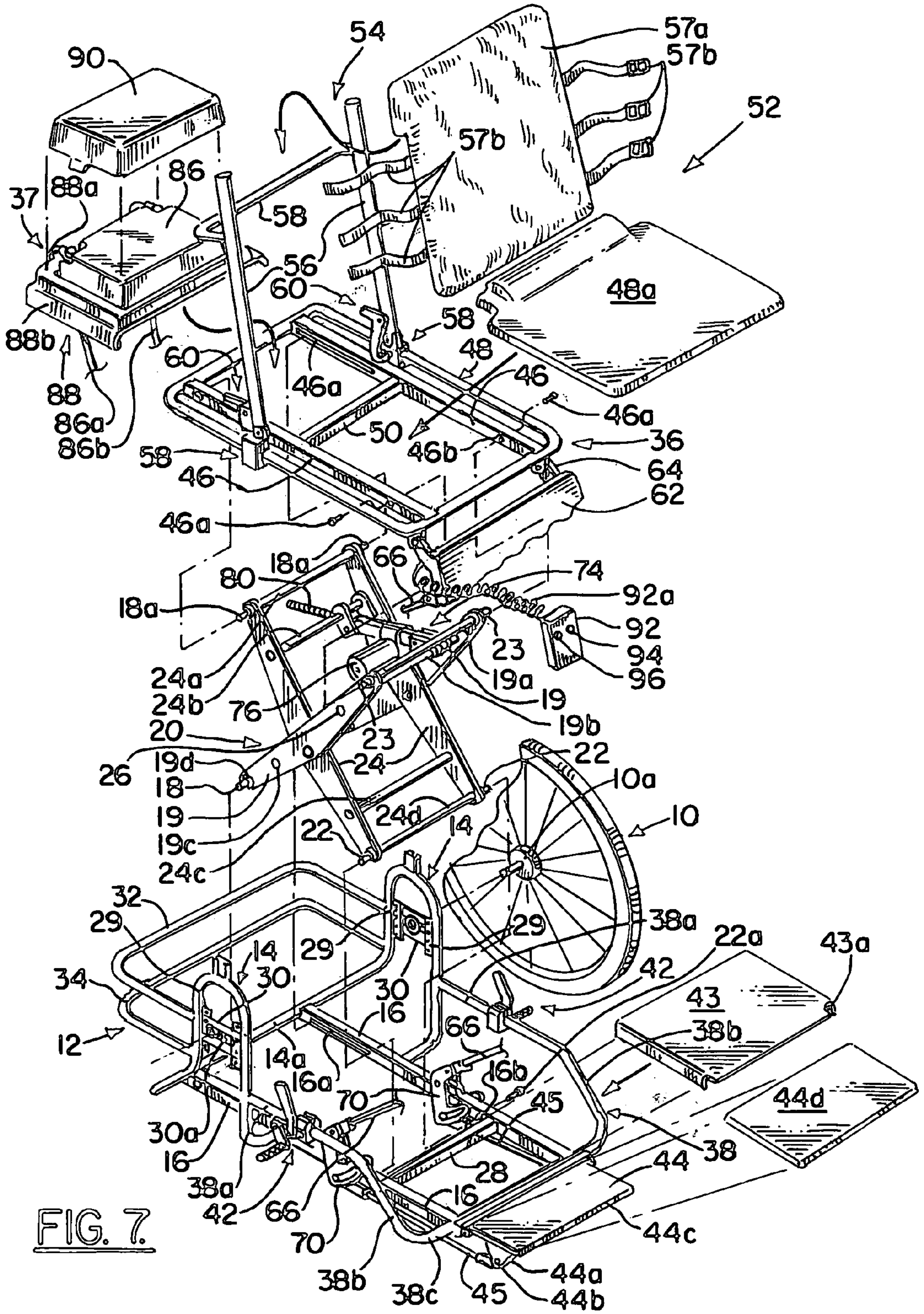
FIG. 7 is an exploded perspective view of the lift wheelchair of the invention with one drive wheel removed, the casters removed, and one drive wheel partly-cut away.

Drive wheels 10—10 and casters 11—11 are connected to a lower tubular support frame generally indicated by the numeral 12 and shown in perspective in FIG. 7. Lower support frame 12 has two wheel arches generally indicated by the numerals 14—14 for rotatably receiving drive wheels 10—10. Preferably each of the wheel arches 14—14 are constructed from one or more sections of tubing having a circular cross-section.

Each of the two wheel arches 14—14 is connected at their lower ends to one of two parallel square tubing sections 16—16. Square tubing sections 16—16 extend the length of lower support frame 12. The inside face of each of square tubing sections 16—16 has an elongated slot 16*a* machined therein for receiving roller bearings 18—18. Roller bearings 18—18 are rotatably connected to the lower end of the cross-members 19—19 of the scissor-lift assembly generally indicated by the numeral 20. Cross-members 19—19 have a plurality of brace members 19*a*, 19*b*, 19*c* and 19*d* extending perpendicularly therebetween. Each slot 16*a* is of sufficient length to allow bearing 18 to roll through the full range of motion of scissor-lift assembly 20 as scissor-lift assembly 20 is lowered from the highest position shown in FIGS. 1 and 3 to the lowest position shown in FIGS. 2, 5, and 6.

Each square tubing section 16—16 has a cylindrical hole 16*b* shown in FIG. 7 therein for rotating receipt of two pivot bushings 22—22 shown at the lower end of the cross-members 24—24 of scissor-lift assembly 20. Cross-members 24—24 have a plurality of brace members 24*a*, 24*b*, 24*c* and 24*d* extending perpendicularly therebetween. Preferably pivot bushings 22—22 are fastened to square tubing sections 16—16. Pivot bushings 22—22 serve as the bearing surface through which pivot pins 22*a*—22*a* are inserted and then tightened into each end of brace member 24*d*. Brace member 24*d* serves as the non-rolling forward end of cross-member 24—24 of the scissor-lift assembly 20. Each pair of cross-members 19 and 24 is rotatably connected by pin 26. Preferably, pin 26 is located at a point approximately 40% of the distance between the brace members at each end of 19—19 and 24—24 and approximately one inch below the centerline formed by the brace members at each end of 19—19 and 24—24.

Each square tubing section 16—16 is joined parallel to the opposite square tubing section 16 with slots 16*a* facing inward by one or more square tubing cross-members 28 shown in FIG. 7. Square tubing cross-members 28 are located toward the front ends of cross-members 24, forward of, and in close proximity to pivot bushings 22 to provide adequate clearance for the movement of scissor-lift assembly 20 and to provide maximum structural strength and rigidity for the two parallel square tubing sections 16—16 supporting scissor-lift assembly 20.

Wheel arches 14—14 are attached to each of the square tubing sections 16—16 at a location that provides the optimal center of gravity to allow the lift wheelchair occupant the greatest level of stability while still enabling the lift wheelchair occupant to perform "wheelies" for obstacle clearance. By "wheelies" is meant the procedure of forcing casters 11—11 up from the surface G upon which the lift wheelchair is traveling by the occupant turning the drive wheels forward with sufficient force and torque to lift casters 11 over obstacles confronted by the lift wheelchair of the invention. The location of wheel arches 14—14 on lower support frame 12 enables the occupant of the lift wheelchair to perform a "wheelie" without having the lower support frame come into contact with the surface G on which the lift wheelchair is traveling.

Wheel arches 14—14 may be made as separate units (two separate arches) or preferably as a single unit (both arches formed on one continuous length of tubing) and integrated into the lower support frame 12 as shown in the drawings and in particular in FIG. 7. As shown in the drawings, the wheel arches 14—14 are formed from a single piece of tubing having a circular cross-section. Wheel arches 14—14 have an elongated section 14*a* connected perpendicularly to the rear ends of each of the square tubing sections 16—16 to function as the rear supporting member of the two parallel square tubing sections 16—16. Wheel arches 14—14 are preferably formed by bending a length of tubing in a sequential manner in a combination of angles and directions to produce the wheel arches 14—14 and integral elongated section 14*a*. Wheel arches 14—14 are formed so that each wheel arch 14 is perpendicular to elongated section 14*a* and each wheel arch 14 is parallel to the other wheel arch 14.

Vertical adjusting brackets 29—29 are connected to the front and rear inside surfaces of both wheel arches 14—14. Each adjusting bracket 29 is a flat plate having a plurality of bolt receiving holes 29*a* therein for receiving bolts to connect axle blocks 30—30 to adjusting brackets 29—29 at various desired heights to enable vertical adjustment of axle blocks 30—30. Each axle block has bolt receiving holes therein for receiving bolts 31 to connect axle block 30 to brackets 29.

Axle blocks 30—30 are manufactured from a material of sufficient thickness so that the finished block will not flex or distort under normal circumstances from the weight of the lift wheelchair and its occupant. Each axle block 30 is of adequate height and length to allow for vertical adjustment in the adjusting brackets 29. Each axle block 30 has a horizontal slot 30*a* therein for receipt of axle support bushing 10*b*. Horizontal adjustment for drive wheels 10 is achieved by moving axle support bushings 10*b* to desired position in slot 30*a*. The axle support bushings 10*b* receive axles 10*a* of drive wheels 10.

Two U-shaped wheel arch support braces 32 and 34 are connected to the rear vertical sections of the wheel arches 14—14 and extend therebetween to provide vertical alignment of the wheel arches 14—14. The width of the wheel arch support braces 32 and 34 matches the width or distance that the wheel arches 14—14 is spaced apart. The depth of wheel arch support braces 32 and 34 is selected to be sufficient for the seat frame assembly generally indicated by the numeral 36 and the battery box generally indicated by the numeral 37 to move inside of wheel arch support braces 32 and 34 as the scissor-lift assembly 20 moves the seat frame assembly 36 upward and downward.

A U-shaped front wheel arch support brace generally indicated by the numeral 38 is connected to the front vertical sections of the wheel arches 14—14 and extend therebetween to provide vertical alignment of the wheel arches 14—14. Front wheel arch support brace 38 has horizontal portions 38*a*—38*a* each of which are parallel to one of the square tubing sections 16—16. Front caster assemblies generally indicated by the numeral 40—40 are attached to horizontal portions 38*a*—38*a* as shown in FIG. 1, and the handbrake assemblies generally indicated by the numerals 42—42 is also attached to horizontal portions 38*a*—38*a*. Caster assemblies 40—40 are conventional wheel chair caster assemblies well known in the art, and handbrake assemblies 42—42 are conventional wheelchair brake assemblies well known in the art.

Front wheel arch support brace 38 has two downward sloping portions 38*b*—38*b* connected perpendicularly by a straight horizontal cross-member 38*c* which is connected to the front ends of each of the square tubing sections 16—16. Preferably, front wheel arch support 38 is formed by bending a length of tubing having a circular cross-section in a sequential manner in a combination of angles and directions to provide support and structural strength for wheel arches 14—14 and to provide cross-member 38*c* connected to the front ends of each of the square tubing sections 16—16.

Connected to the top front end of square tubing sections 16—16 is stationary footrest 43. Stationary footrest 43 has a concave front lip 43*a* which fits over the top of cross-member 38*c*. Stationary footrest 43 is made from a material of sufficient thickness and strength to provide a semi-rigid surface capable of supporting the weight of the occupant without excessive bending or flexing. The material from which stationary footrest 43 is made is such that it can be machined or molded using standard techniques known in the art. A variety of polymeric materials commonly referred to as plastics may be used and are preferred.

A rotatable footrest 44 is rotatably connected to cross-member 38*c* by a hinge 38*d*. Rotatable footrest 44 provides additional length to stationary footrest 43 for resting the feet of the occupant when the lift wheelchair of the invention is in the fully raised position of FIGS. 1 and 3. Preferably, rotatable footrest 44 is made from aluminum about one-eighth inch thick. The rotatable footrest cover 44D is made from the same material from which stationary footrest 43 is made. Two pushrods 45—45 are each rotatably connected at their front ends to brackets 44*a*—44*a* by pin 44*b* on the bottom side of movable foot rest 44.

Seat frame assembly 36 includes two parallel square tubing sections 46—46. Square tubing sections 46—46 are connected at their ends to the rectangular seat frame generally indicated by the numeral 48 preferably made from metal tubing having a circular cross-section. The inside face of each of square tubing sections 46—46 has an elongated slot 46*a* machined therein for receiving roller bearings 18*a*—18*a*. Roller bearings 18*a*—18*a* are rotatably connected to the upper end of the cross-members 24—24 of the scissor-lift assembly generally indicated by the numeral 20. Each slot 46*a* is of sufficient length to allow bearing 18*a* to roll through the full range of motion of scissor-lift assembly 20 as scissor-lift assembly 20 is raised to the highest position shown in FIGS. 1 and 3 to the lowest position shown in FIGS. 2, 5, and 6.

Each square tubing section 46—46 has a cylindrical hole 46*b* therein for rotating receipt of two pivot bushings 23—23. These pivot bushings serve as the bearing surface through which pivot pins 45*a* are inserted and then tightened into the ends of brace member 19*a*. Pivot bushings 23—23 serve as the pivot locations for the non-rolling upper forward ends of cross-members 19—19 of the scissor-lift assembly 20.

Each square tubing section 46 is joined to the opposite square tubing section 46 with slots 46*a* facing inward by one or more square tubing cross-members 50. Square tubing cross-member 50 is located near the center of square tubing sections 46 to provide maximum structural strength and rigidity for the two parallel square tubing sections 46—46 and seat frame 48 supporting the seat assembly generally indicated by the numeral 52.

Extending upward from seat frame 48 is the adjustable seat back assembly generally indicated by the numeral 54. Seat back assembly 54 includes two vertical lengths of tubing 56—56 connected by U-shaped cross-member 58. The two vertical lengths of tubing 56—56 are connected at their lower ends to adjustable seat brackets generally indicated by the numerals 58—58 which are connected to seat frame 48. A lever assembly 60 is connected to the lower end of each of the two vertical lengths of tubing 56—56 to lock each of the vertical lengths of tubing 56—56 at a predetermined angle to adjustable seat brackets 58—58.

Preferably the two lengths of tubing 56—56 are encapsulated with a fabric seat back cover 57*a* held by straps 57*b*. Molded seat 48*a* is connected to seat frame 48.

A rotating ramp 62 is connected near the front end of seat frame 48 by pins 64*a* to two ramp support brackets 64—64. One ramp support bracket 64 is rigidly connected to the bottom of each of the two parallel square tubing sections 46—46.

Figure 10:
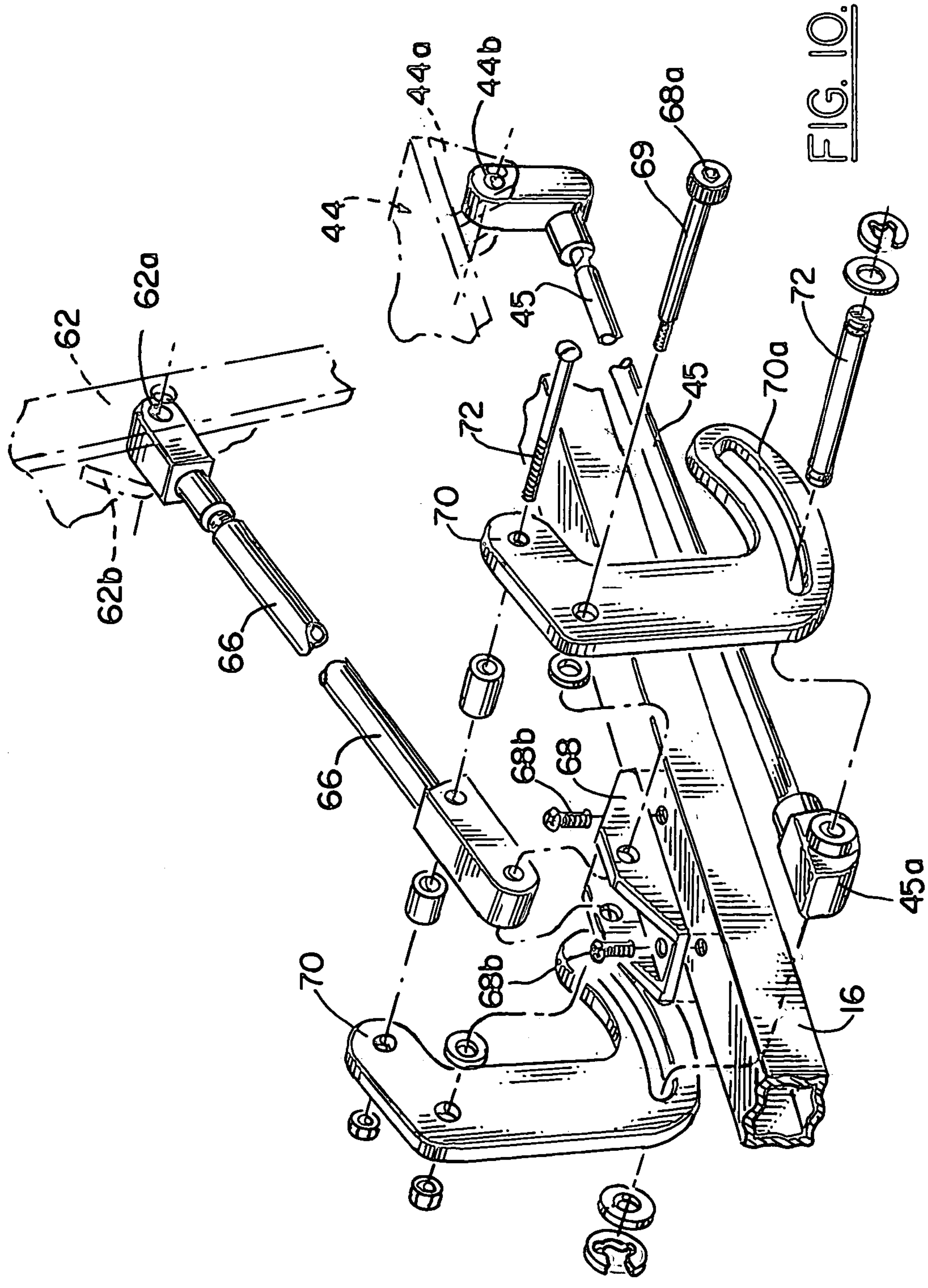
FIG. 10 is an enlarged exploded perspective view of the pushrods and slot plates of the lift wheelchair of the invention.

One of two pushrods 66—66 is rotatably connected at its front end by pin 62*a* to one of the two brackets 62*b*—62*b* shown in phantom lines in FIG. 10 on the bottom side of rotating ramp 62. As shown in FIG. 10, each of the pushrods 66—66 is rotatably connected at its rear end to one of the push rod brackets 68—68 by shoulder bolt 68*a*. Shoulder bolt 68*a* has a cylindrical center portion 69 which has a smooth outer surface about which pushrods 66—66 rotate. Pushrod brackets 68—68 are rigidly connected to the top of each of the square tubing sections 16—16 by screws 68*b*—68*b*. Pushrods 66—66 have two parallel slot plates 70—70 connected thereto by bolt 68*a* and screw 72. Screw 72 causes slot plates 70—70 to rotate about center portion 69 of shoulder bolt 68*a* as pushrods 66—66 rotate about shoulder bolt 68*a*.

Each of the slot plates 70 have a curved elongated slot 70*a* located on the lower end of slot plate 70 beneath shoulder bolt 68*a*. A pushrod pin 72 extends through the slots 70*a* of a pair of slot plates 70—70 on each side of square tubing section 16 and through the bracket 45*a* on the rear end of pushrod 45 to rotatably connect pushrod 45 to slots 70*a*.

An electric motor assembly generally indicated by the numeral 74 is connected to brace members 19*b* and 24*b*. Motor assembly 74 includes linear electric motor 76 rotatably connected by bracket 78 to brace member 19*b*. Extending from electric motor 76 is an externally threaded rotating drive screw 80 which is received in internally threaded clutch 82. Internally threaded clutch 82 is rotatably connected to bracket 84 which is rigidly connected to brace member 24*b*.

Electrical energy is supplied to electric motor 76 by battery 86. Battery 86 is held in battery box 37 having a lid 90 for covering the top of battery 86. Battery box 37 has a lower curved lip 88*a* which is connected to the rear end of rectangular seat frame 48. Lower curved lip 88*b* fits over and rests on square tubing 46—46. A hand held switch 92 is connected by electrical wires 92*a* to electrical wires 86*a* and 86*b* of battery 86 and to electric motor 76 to selectively energize electric motor 76. Hand held switch has one switch button 94 for energizing electric motor 76 to rotate drive screw 80 in one direction to lower seat frame 48 and another button 96 for energizing electric motor 76 to rotate drive screw 80 in the opposite direction to raise seat frame 48.

Figure 3:
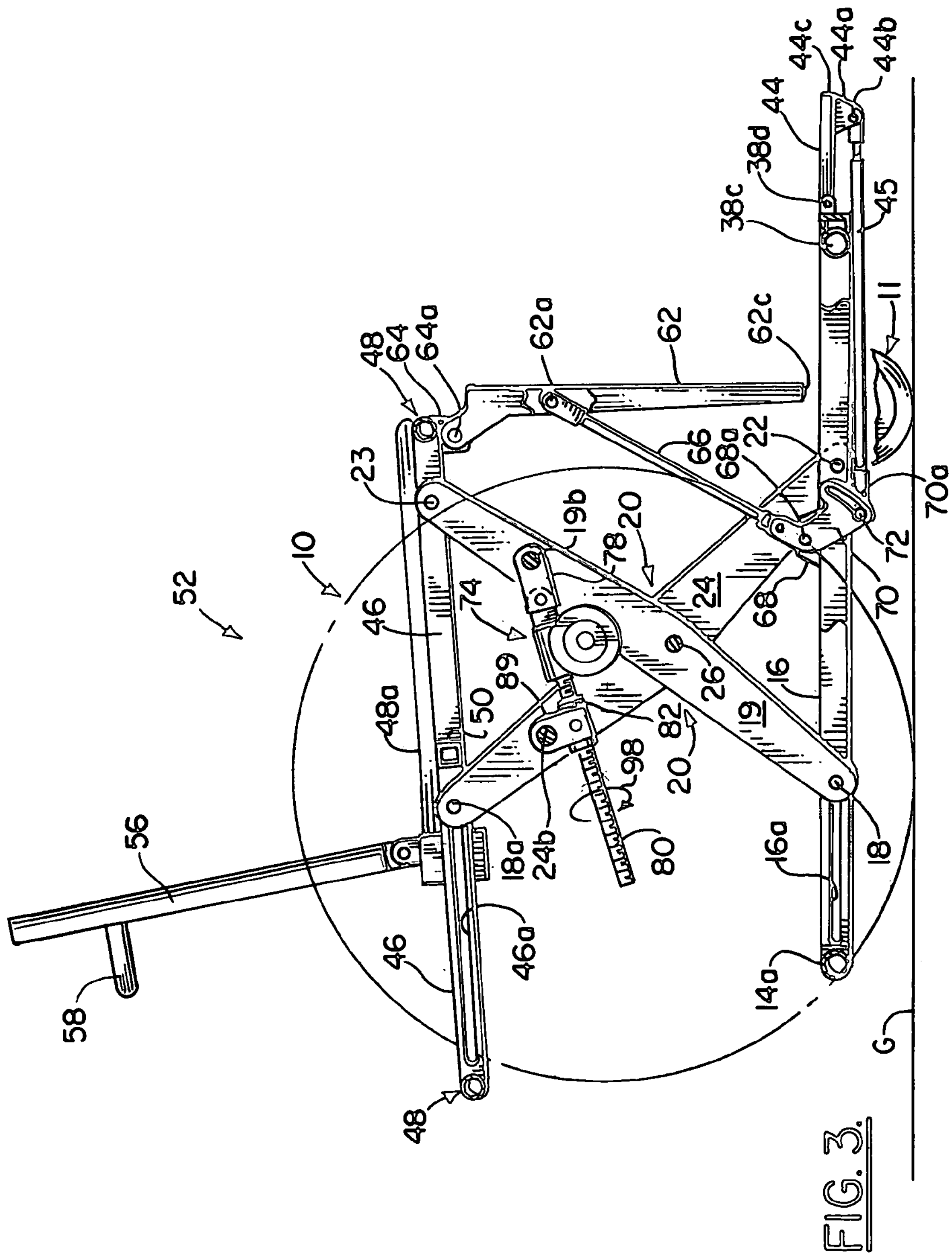
FIG. 3 is a partly cut-away, partly schematic side elevational view of the lift wheelchair of the invention in the normal elevated position of FIG. 1 showing the scissor lift components in greater detail with some of the tubular support frame components removed.
Figure 4:
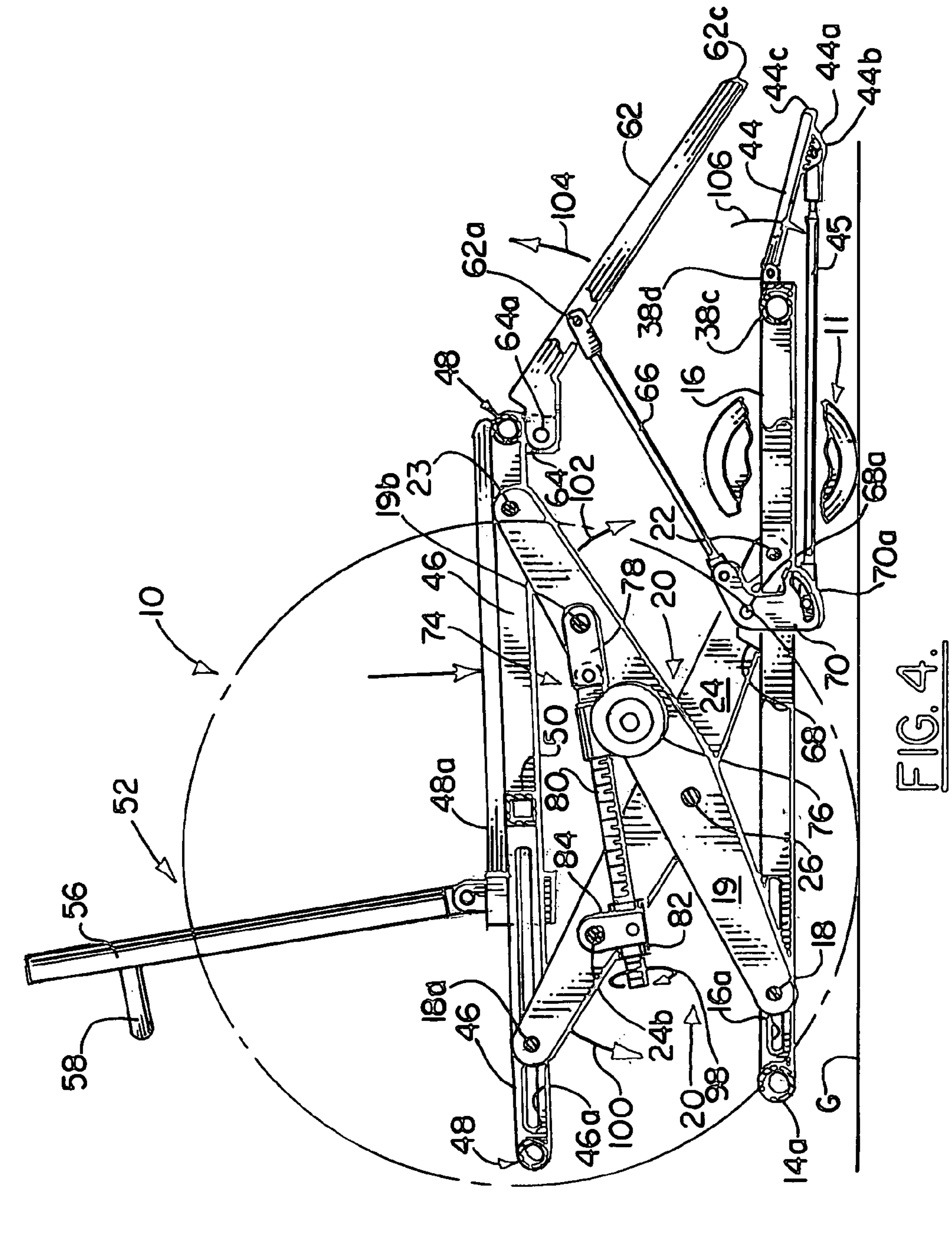
FIG. 4 is a partly cut-away, partly schematic side elevational view of the lift wheelchair of the invention in an intermediate lowered position between the position of FIG. 1 and of FIG. 2 showing the scissor lift components in greater detail with some of the tubular support frame components removed.
Figure 8:
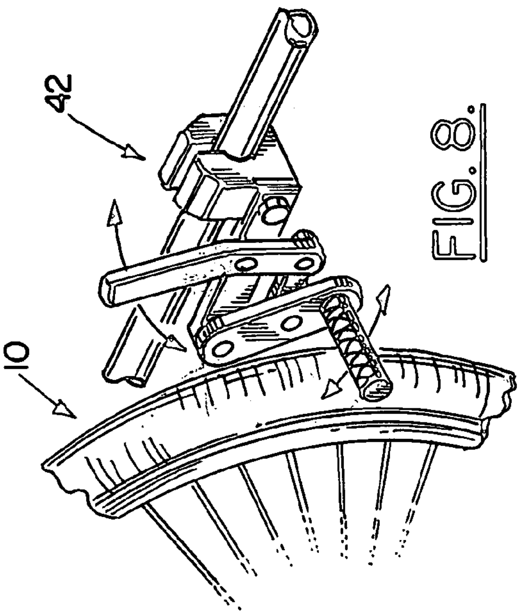
FIG. 8 is a partly cut-away, detailed perspective view of the hand brake of the invention.
Figure 5:
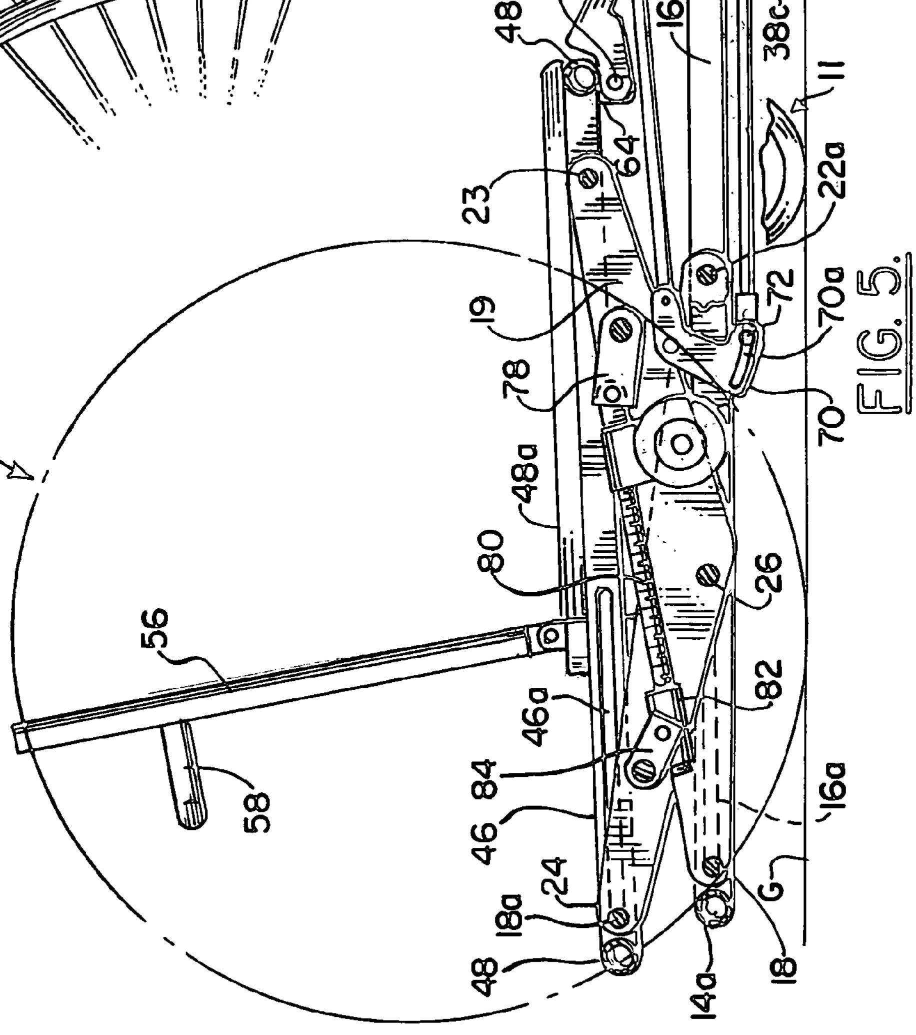
FIG. 5 is a partly cut away, partly schematic side elevational view of the lift wheelchair of the invention in the lowered position of FIG. 2 showing the scissor lift components in greater detail with some of the tubular support frame components removed.

To lower the occupant and seat frame 48 from the position shown in FIGS. 1 and 3 to the position shown in FIGS. 2, 5, and 6, button 94 is depressed to energize electric motor 76 and rotate drive screw 80 in the direction indicated by the arrow 98 in FIGS. 3 and 4. Clutch 82 and bracket 84 is forced away from bracket 78 causing cross-members 19—19 to rotate in the direction indicated by the arrow 102 in FIG. 4 and causing cross-members 24—24 to rotate in the direction indicated by the arrow 100 in FIG. 4. As cross-members 24—24 rotate in the direction indicated by the arrow 100, bearings 18*a*—18*a* move toward the rear end of slots 46*a*– 46*a*. As cross-members 19—19 rotate in the direction indicated by the arrow 102, bearings 18—18 move toward the rear end of slots 16*a*—16*a*. As seat frame 48 descends, pushrods 66—66 force ramp 62 to rotate upward in the direction indicated by the arrow 104 in FIG. 4, and footrest 44 rotates downward in the direction indicated by the arrow 106 in FIG. 4 as slot plate 70 and slot 70*a* rotate clockwise about shoulder bolt 68*a*, thereby enabling pin 72 in pushrod 45 to be forced by the weight of footrest 44 toward the rear end of slot 70*a*. When seat frame 48 reaches the position shown in FIG. 5, pin 72 is forced against the front end of slot 70*a*, thereby retracting pushrod 45 to its rear-most position to rotate footrest 44 to the position shown in FIGS. 5 and 6.

Figure 9:
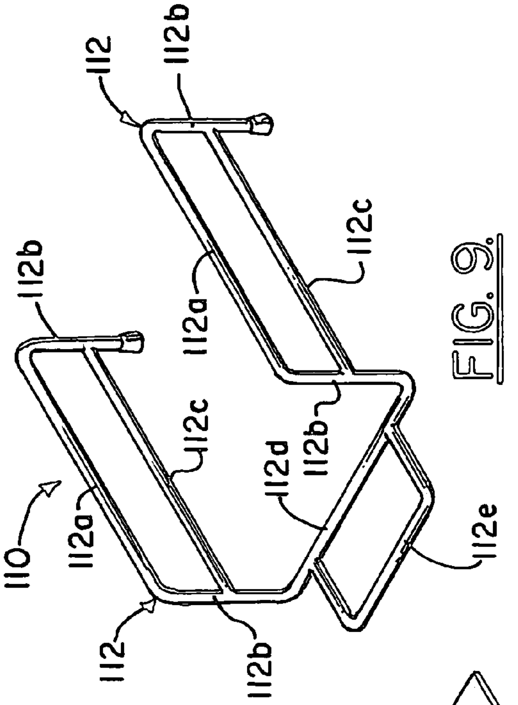
FIG. 9 is an enlarged perspective view of the access frame of the invention shown in FIG. 6 utilized to mount or exit the lift wheelchair of the invention from the ground or floor.

As shown in FIGS. 6 and 9, an access frame generally indicated by the numeral 110 may be utilized to assist the occupant in entering and exiting the lift wheelchair of the invention when the seat frame 48 is in the lowest position. Access frame 110 includes two U-shaped parallel hand rail sections generally indicated by the numeral 112 having a horizontal hand rail 112*a* with two vertical support legs 112*b* connected to each end thereof. Preferably, a horizontal brace 112*c* is connected between opposite vertical support legs 112*b* at the approximate midpoint thereof. Each of the two U-shaped hand rail sections 112 are connected at ground level G of access frame 110 by cross-member 112*d* which is connected perpendicularly to opposite vertical legs 112*b* and perpendicularly to hand rail sections 112. To prevent the front legs of the access frame from lifting up once body weight is applied to the rearward portion of the access frame hand rails a U-shaped wheel blocking section 112*e* is connected perpendicularly to cross-member 112*d* parallel to the ground G extending in a direction opposite to the direction in which hand rails 112*a* extend.

As best shown in FIGS. 1 and 6, to utilize the access frame 110 to dismount or exit the lift wheelchair of the invention, the occupant of the lift wheelchair of the invention rolls drive wheels 10—10 forward to drive casters 11—11 into access frame 110 until the casters 11—11 lie between the two U-shaped hand rail sections 112 past cross-member 112*d*, and U-shaped wheel blocking section 112*e* lies between drive wheels 10—10 and casters 11—11. The occupant then lowers seat frame 48 from the position shown in FIG. 1 to the position shown in FIG. 6 utilizing hand held switch 92. The handbrakes 42 are then actuated by the occupant to lock drive wheels 10—10. Next, the occupant grasps opposite hand rails 112*a* with each of the occupant's hands, and the occupant pulls forward in the direction indicated by the large arrow 114 to exit or dismount from the lift wheelchair of the invention. Ramp 44 provides an inclined plane for assisting the occupant in exiting, or entering, the lift wheelchair of the invention. The front edge 44*c* of rotatable footrest 44 rotates downward to the ground level G to provide clearance for the front edge 62*c* of ramp 62 to rotate to the ground level G. Cross-member 112*d* contacts the drive wheels 10—10 or casters 11—11 if the access frame 110 slides forward or backward during the exit or dismount of the occupant from the lift wheelchair of the invention.

When an individual lying on surface G wishes to enter or mount the lift wheelchair of the invention, the procedure of the preceding paragraph is reversed.

Although the preferred embodiments of the invention have been described in detail above, it should be understood that the invention is in no sense limited thereby, and its scope is to be determined by that of the following claims:

What is claimed is:

1. A wheelchair that enables an occupant to lower and raise their self to and from the surface on which the wheelchair is resting so that the occupant may enter the wheelchair from said surface without the aid of another person, the wheelchair comprising:

a. a lower support frame having two drive wheels and two casters connected thereto, b. a seat frame assembly vertically movable between said two drive wheels, said seat frame assembly having a horizontal seat connected thereto, c. a lifting assembly connected to said lower support frame and to said seat frame assembly for vertically moving said seat frame assembly upward and downward between said two drive wheels, d. a planar ramp rotatably connected to said seat frame, said planar ramp rotating to form an inclined plane relative to the plane of said horizontal seat to provide an inclined planar surface for said occupant to slide upon when said occupant is exiting or entering said horizontal seat when said seat frame is at the lowest vertical position, said planar ramp rotating to a vertical position relative to said horizontal seat beneath said horizontal seat when said seat frame assembly is at the highest vertical position, and e. a footrest rotatably connected to said lower support frame for supporting the feet of said occupant when said seat frame assembly is at the highest vertical position, said footrest rotating to a horizontal position when said seat frame assembly is at the highest vertical position, said footrest rotating downward beneath said ramp when said seat frame assembly is at the lowest vertical position.

2. The wheelchair of claim 1 wherein said lifting assembly has an electric motor connected thereto for supplying lifting force to said lifting assembly.

3. The wheelchair of claim 1 wherein said wheelchair has a battery for supplying electrical energy to said electric motor.

4. The wheelchair of claim 1 wherein said electric motor has a switch connected thereto for operating said electric motor to raise or lower said seat frame assembly.

5. A wheelchair that enables an occupant to lower and raise their self to and from the surface on which said wheelchair is resting so that the occupant may enter the wheelchair from said surface without the aid of another person, the wheelchair comprising:

a. a rectangular support frame having a front end, a rear end, and two opposite sides, said rectangular support frame having a drive wheel connected to each of said two opposite sides of said support frame, said rectangular support frame having two casters connected thereto, b. a rectangular seat frame having a front end, a rear end, and two opposite sides, said rectangular seat frame being located above said rectangular support frame, said rectangular seat frame being vertically movable between said two drive wheels, said rectangular seat frame having a horizontal seat connected thereto, c. a lifting assembly connected to said rectangular support frame and to said rectangular seat frame for vertically moving said seat frame assembly upward and downward between said two drive wheels, d. a planar ramp rotatably connected to said front end of seat frame, at least one pushrod connected to said planar ramp and to said support frame for rotating said planar ramp to an inclined plane relative to said horizontal seat when said seat frame is at the lowest vertical position to provide an inclined planar surface for said occupant to slide upon when said occupant is exiting or entering said horizontal seat, said planar ramp being rotated by said pushrod to a vertical position relative to said horizontal seat when said horizontal seat is at the highest vertical position, and f. a footrest rotatably connected to said front end of said rectangular support frame for supporting the feet of said occupant when said seat frame assembly is at the highest vertical position, at least one pushrod connected to said footrest and to said rectangular support frame for rotating said footrest to a horizontal position when said rectangular seat frame is at the highest vertical position, said footrest being rotated by said pushrod downward at an inclined angle to said rectangular support frame beneath said planar ramp when said seat frame assembly is at the lowest vertical position.

6. The wheelchair of claim 5 wherein said lifting assembly has an electric motor connected thereto for supplying lifting force to said lifting assembly.

7. The wheelchair of claim 5 wherein said wheelchair has a battery for supplying electrical energy to said electric motor.

8. The wheelchair of claim 5 wherein said electric motor has a switch connected thereto for operating said electric motor to raise or lower said seat frame assembly.

9. The wheelchair of claim 5 wherein said lifting assembly comprises a scissor-lift mechanism having a. a first pair of two elongated cross-members rotatably connected together by a pin, and b. a second pair of two elongated cross-members rotatably connected together by a pin.

10. The wheelchair of claim 9 wherein each pair of said two elongated cross-members lie in spaced-apart parallel vertical planes between said two drive wheels, and at least two brace members are connected perpendicularly between each cross-member of each pair of said two elongated cross-members.

11. The wheelchair of claim 10 wherein each of said cross-members has an upper end and a lower end, said upper end of each of said cross-members being connected to said rectangular seat frame and said lower end of each of said cross-members being connected to said rectangular support frame.

12. The wheelchair of claim 11 wherein said upper end of one of each pair of said cross-members is rotatably pinned to said seat frame assembly, and the lower end of one of each pair of said cross-members is rotatably pinned to said support frame.

13. The wheelchair of claim 12 wherein said upper end of one of each pair of said cross-members has a bearing connected thereto which is slidably received in an elongated slot in said rectangular seat frame, and the lower end of one of each pair of said cross-members has a bearing connected thereto which is slidably received in an elongated slot in said rectangular support frame.

14. A wheelchair that enables an occupant to lower and raise their self to and from the surface on which the wheelchair is resting so that the occupant may enter the wheelchair from said surface without the aid of another person, the wheelchair comprising:

a. a lower support frame means having two drive wheels and two casters connected thereto, b. a seat frame assembly means vertically movable between said two drive wheels, said seat frame assembly having a horizontal seat connected thereto, c. a lifting assembly means connected to said lower support frame and to said seat frame assembly for vertically moving said seat frame assembly upward and downward between said two drive wheels, d. a planar ramp means rotatably connected to said seat frame, said planar ramp rotating to form an inclined plane relative to the plane of said horizontal seat to provide an inclined planar surface for said occupant to slide upon when said occupant is exiting or entering said horizontal seat when said seat frame is at the lowest vertical position, said planar ramp rotating to a vertical position relative to said horizontal seat beneath said horizontal seat when said seat frame assembly is at the highest vertical position, and e. a footrest means rotatably connected to said lower support frame for supporting the feet of said occupant when said seat frame assembly is at the highest vertical position, said footrest rotating to a horizontal position when said seat frame assembly is at the highest vertical position, said footrest rotating downward beneath said ramp when said seat frame assembly is at the lowest vertical position.

15. The wheelchair of claim 14 wherein said lifting assembly has an electric motor connected thereto for supplying lifting force to said lifting assembly.

16. The wheelchair of claim 14 wherein said wheelchair has a battery for supplying electrical energy to said electric motor.

17. The wheelchair of claim 14 wherein said electric motor has a switch connected thereto for operating said electric motor to raise or lower said seat frame assembly.

* * * * *